United States Patent [19]

Cournoyer et al.

[11] Patent Number: 4,894,162

[45] Date of Patent: Jan. 16, 1990

[54] TREATMENT OF VOLATILE ORGANIC SUBSTANCES AT WASTE WATER TREATMENT PLANTS

[75] Inventors: Richard Cournoyer, Whitehouse Station, N.J.; Thomas Jakopp, Kaisten, Switzerland; G. E. Friberg, Toms River, N.J.

[73] Assignee: Ciba-Geigy Corporation, Ardsley, N.Y.

[21] Appl. No.: 187,035

[22] Filed: Apr. 27, 1988

[51] Int. Cl.⁴ .............................................. C02F 3/20
[52] U.S. Cl. .................................. 210/603; 210/626; 210/631; 210/916; 55/84; 435/266
[58] Field of Search .................. 210/188, 195.3, 218, 210/603, 626, 631, 916; 55/84, 94, 120; 435/266; 261/23.1

[56] References Cited

U.S. PATENT DOCUMENTS

| | | | |
|---|---|---|---|
| 1,851,030 | 3/1932 | Adams | 210/188 |
| 2,360,811 | 10/1944 | Kelly et al. | 210/195.3 |
| 2,360,812 | 10/1944 | Kelly et al. | 210/631 |
| 2,661,332 | 12/1953 | Mortenson | 210/188 |
| 2,786,025 | 3/1957 | Lamb et al. | 210/603 |
| 2,881,137 | 4/1959 | Logan | 210/603 |
| 3,216,905 | 6/1963 | Baptist | 195/2 |
| 3,335,082 | 8/1967 | Ullrich | 210/916 |
| 3,803,029 | 4/1974 | Blecharczyk | 210/618 |
| 3,828,525 | 8/1974 | Copa et al. | 55/68 |
| 3,855,121 | 12/1974 | Gough | 210/610 |
| 3,904,518 | 9/1975 | Hutton et al. | 210/610 |
| 4,069,148 | 1/1978 | Hutton et al. | 210/610 |
| 4,073,722 | 2/1978 | Grutsch et al. | 210/631 |
| 4,201,663 | 5/1980 | Rollag et al. | 210/618 |
| 4,292,176 | 9/1981 | Grutsch et al. | 210/631 |
| 4,544,381 | 10/1985 | Schmidt | 55/89 |
| 4,781,732 | 11/1988 | Wondrasch et al. | 435/266 |

FOREIGN PATENT DOCUMENTS 57-207598 12/1982 Japan.
58-24394 2/1983 Japan.
58-64190 4/1983 Japan.

Primary Examiner—Peter Hruskoci
Assistant Examiner—Christopher Upton
Attorney, Agent, or Firm—Kevin T. Mansfield; Edward McC. Roberts

[57] ABSTRACT

A method and apparatus for purifying industrial waste fluids by an aerobic biological treatment is provided herein, which is capable of concurrently purifying waste gases emanating from such waste liquids. The improvement relates to the elimination or reduction of odors and volatile organic substances by enclosing all tanks and basins from the influent of the waste water treatment plant up to the aeration treatment zone for the liquid waste water and venting these gases to an aerobic digester and/or an aeration basin to biologically decompose or degrade the VOS in the waste gas by action of the microorganisms in the aeration basin or aerobic digester.

7 Claims, 2 Drawing Sheets

TREATMENT OF VOLATILE ORGANIC SUBSTANCES AT WASTE WATER TREATMENT PLANTS

FIELD OF THE INVENTION

This invention relates to the elimination or reduction of odors and volatile organic substances (VOS) from waste water treatment plants. More particularly, the present invention relates to a method and apparatus for concurrently treating industrial waste water and off-gases which emanate from the apparatus used for preliminarily treating the waste water prior to the final purification steps therefor by collecting these off-gases and passing them through one of the final stages of the waste water treatment process.

BACKGROUND OF THE INVENTION

Efforts to treat industrial waste water are well known. One of the more successful of the techniques for treating industrial waste water is disclosed in U.S. Pat. No. 4,069,148 to Hutton et al., in which industrial waste water is treated by a biological treatment process in the presence of activated carbon or fuller's earth, the biological treatment being enhanced by the presence of the activated carbon or fuller's earth to produce a relatively pure water product which, for the most part, can be directly disposed of into natural bodies of water.

In the apparatus for carrying out the patented process, there is provided means for providing a primary treatment, which includes a piece of equipment, commonly called a neutralizer, for adjusting the acidity of the waste water, and a piece of equipment called a clarifier into which the waste water which has had the acidity adjusted is directed in order to permit solids to settle out from the waste water. Moreover, in practical use, the apparatus for carrying out the patent process also includes such pieces of equipment as flow splitters, which split the flow of industrial waste water into several streams for treatment in parallel parts of the overall apparatus, and also additional treatment apparatus in which flocculating agents and nutrients for supporting the biological action in the biological treatment zone are added. There are also further clarifiers in which the liquid is again allowed to stand so that further solids can separate out.

In each of these pieces of equipment, the surface of the liquid is exposed to the atmosphere, and the malodorous volatile organic gases which are present in the waste water begin to escape into the atmosphere. This process is often promoted by the agitation of the waste water in these pieces of equipment.

The prior art process described above is therefore not concerned with the treatment of these volatile organic gases and accordingly these malodorous gases are permitted to escape into the atmosphere resulting in pollution of the surrounding atmosphere.

Recently, the Environmental Protection Authorities of the various state governments have become increasingly strict on the quality of gases which are allowed to escape from industrial operations, and it is now becoming necessary to consider these gases and how to treat them so as to remove substantially all of the pollutants therefrom.

It is, of course, known to treat gases including volatile organic gases therein for removal of such volatile organic gases. One common way of doing this is to pass the gases over activated carbon particles, or the like, which adsorb the gases selectively, allowing the harmless gases, such as oxygen or carbon dioxide, to pass therethrough.

Another type of treatment which has been proposed is to pass the gases containing the volatile organic gases through naturally decomposable organic material, such as ground-up plants, tree limbs, or the like, for converting such material to mulch, during which the volatile organic gases are partially adsorbed from the stream of gases being passed through the mulch.

Neither of these types of gas purification processes has been found to be particularly effective. Difficulties occur in the use of the activated carbon particles, since contact with air results in an oxidation process which is exothermic, causing elevation of the temperature of the carbon particles, and tending to cause fires in the treatment apparatus. The quantity of natural organic material needed for removal of the volatile organic gases from a stream of flowing gases is so large that if the stream of flowing gases is at all voluminous, an impractically large amount of natural organic material is needed for the purification process.

OBJECTIVES OF THE PRESENT INVENTION

With the above prior art problems in mind, it is an object of the present invention to provide a method and apparatus for purification of industrial waste fluids, namely industrial waste liquid and industrial waste gas escaping therefrom, which overcomes the difficulties of the prior art, and which is simple and effective.

It is a further object of the present invention to provide such a method and apparatus in which existing apparatus and process steps used for purifying the industrial waste liquid can also be used for purifying the off-gases from such liquid with only minor modifications, so that no major pieces of apparatus need to be added to existing waste water purification apparatus.

It is a still further object of the present invention to provide such a method and apparatus which carries out the purification of both the liquid and the gas with such high efficiency that the liquid and gas can be released directly from the end steps of the process and the end elements of the apparatus directly into the environment without further treatment.

SUMMARY OF THE INVENTION

The above objects are accomplished by the present invention which achieves these objects by enclosing all tanks and basins in the primary treatment portion of the apparatus from the influent of the waste water treatment plant up to the aeration biological treatment zone for treating the organic matter in the waste water in order to collect the gases from these tanks and basins; then venting the collected gases from such enclosed tanks and basins to an aeration treatment zone or to an aerobic digesting zone to biologically decompose or degrade the volatile organic substances (VOS) in the waste water by action of the microorganisms in the aeration treatment zone or the aerobic digester. The advantage of using such a biological system to remove the volatile organic substances is that this treatment results in the virtual destruction of the VOS and no additional treatment or disposal is necessary. Further, according to Applicants method and apparatus, it is possible to concurrently eliminate the waste gases containing the VOS along with the treatment of the waste water in a biological waste treatment plant by a relatively simple modification of the existing treatment plant set-up. In order to appreciate the method of the present invention the modified apparatus used to carry out this method will be first described to clarify how the waste water and off-gases are simultaneously treated in a single operation.

THE APPARATUS FOR CARRYING OUT THE INVENTION

The apparatus employed according to the present invention comprises an aerobic biological treatment zone for treating industrial waste water with a mixture of biologically active solids and activated carbon particles in a so-called PAC (powered activated carbon) system as employed in the Hutton U.S. Pat. No. 4,069,143 discussed above; means for imparting a primary treatment to industrial waste water including at least adjusting the pH of the industrial waste water and removing solids therefrom and supplying the thus primarily treated waste water to said aerobic biological treatment zone; means connected to said aerobic biological treatment zone for receiving treated industrial waste water therefrom and separating the sludge produced in said aerobic biological treatment zone from the thus treated industrial waste water; an aerobic biological digesting zone for digesting the sludge from said aerobic treatment zone with a mixture of biologically active solids and activated carbon particles remaining in the sludge; means connected between said separating means and said aerobic treatment zone and said aerobic digesting zone for recycling some sludge from said separating means to said aerobic treatment zone and conveying the remainder of the sludge to said aerobic digesting zone; off-gas collecting means operatively associated with said primary treatment means for collecting volatile substances given off from the waste water and mixed with air in said primary treatment means, and directing the thus collected mixture of air and off-gases to at least one of said aerobic treatment zone and said aerobic digesting zone for supplying air for the treatment in the zone and for substantially completely removing the organic gases therefrom.

BRIEF DESCRIPTION OF THE DRAWINGS

Other and further objects and advantages of the present invention will become apparent from the following specification and claims, taken together with the accompanying drawings, in which:

DETAILED DESCRIPTION OF THE INVENTION

Figure 1:
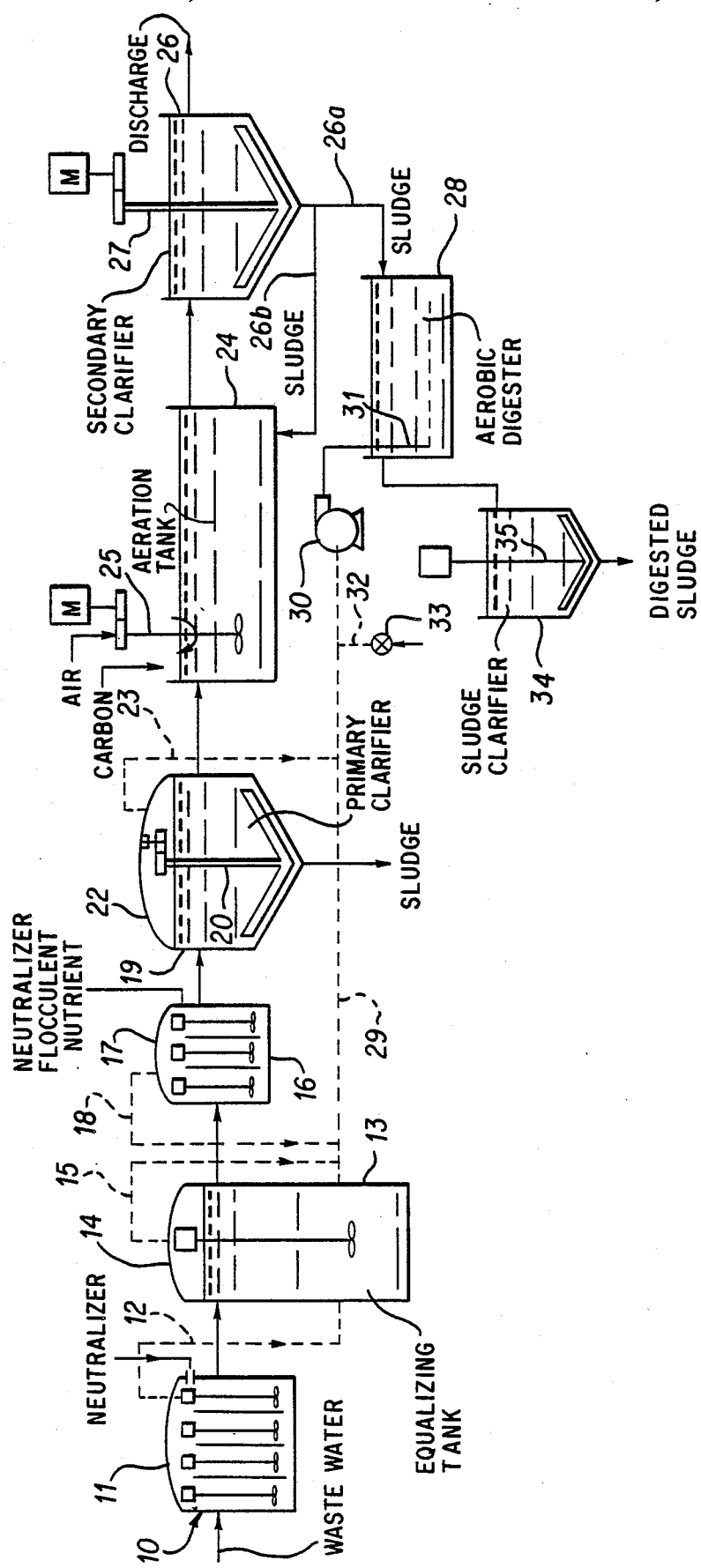
FIG. 1 is a diagrammatic view of an apparatus for purifying industrial waste fluids according to the present invention.

The method for eliminating or reducing malodorous off-gases and VOS according to the present invention essentially includes enclosing all of the apparatus pieces involved in the primary treatment of waste water in an aerobic biological waste water treatment plant to collect the off-gases, including all tanks and basins from the influent of the treatment plant up to the aeration basin(s), and directing these gases to either or both of the aeration treatment zone or the aerobic digester in the biological treatment system. The apparatus enclosed in this primary treatment means is specifically all tanks and basins used for neutralization, equalization, primary clarification as well as lift stations and splitter boxes conventionally used in primary treatment of waste water. These various tanks and basins, etc. have previously been left uncovered as pointed out in respect to U.S. Pat. No. 4,069,148. According to Applicants method, using this modified apparatus, the VOS is biologically decomposed or degraded by the action of the microorganism in the aeration treatment basin and/or the aerobic digester. Both the aeration treatment basin and the aerobic digester contain powered activated carbon (PAC) which because of its absorbency power, greatly enhances the removal efficiency of VOS.

The off-gases vented from the primary waste water treatment equipment are vented into the aeration basin and/or aerobic digester by means of various conduits ordinarily connected to a common gas line, which common gas line is typically connected to the intake of an air blower which in turn is connected to an air intake valve so that the off-gases with or without the addition of outside air, may be directed into the aeration basin and/or aerobic digester. This biological treatment of the VOS results in the destruction of the VOS and no additional treatment or disposal is necessary. Thus, according to the present invention, the VOS can be removed with little modification of the existing aerobic treatment plant apparatus and industrial waste fluids including both the liquids and gases can be concurrently purified, simply and efficiently, without the addition of cumbersome and less efficient VOS removing means.

In the preferred embodiment of the present invention, the off-gases are preferably funnelled or vented to the aerobic digester because the VOS can be quickly and rather efficiently destroyed without significantly interfering with the main purpose of the digester which is to reduce the volume of the sludge. This is because the microorganisms in the aerobic digester are more or less "starved" as opposed to the microorganisms in the aeration basin which are more or less continually fed organic matter through the waste water being introduced into the basin. Thus, the microorganisms in the aerobic digester quickly grab up and destroy the relatively low concentrations of the VOS in the off-gases without significantly interfering with the digesting process which ordinarily occurs therein and which is conventionally the main function of this digester. This is because of the relatively small amount of VOS introduced into said digester. In this connection, while a maximum VOS concentration of several thousand ppm can occasionally be expected at the influent of the waste water treatment plant due to batch operations, the total content of VOS treated in the biological treatment zones after equalization and combining with other vent streams is in the range of 50 ppm–500 ppm. By passing the VOS through the aerobic digester, the total VOS removal is ordinarily above 95 and up to 99%.

The preferred apparatus for carrying out the present invention will now be described in respect to FIGS. 1-3 of the drawings.

The apparatus for carrying out the purification of industrial waste fluids according to the present invention comprises a series of pieces of apparatus for purifying industrial waste water, to which has been added a means for purifying the mixture of air and volatile organic off-gases from the industrial waste liquid being handled in the same apparatus.

The apparatus for treating the industrial waste water comprises means for imparting a primary treatment to the waste water, including a first neutralizer 10 to which the industrial waste water is supplied, and in which a neutralizing material, such as an acid (e.g. HCl or $H_2SO_4$) or a base (e.g. caustic or lime) is added to adjust the pH of the waste water to the desired pH (preferably within a pH range of 6–9) in order to permit it to be treated by a biological treatment further along in the apparatus. The apparatus can have a plurality of separate compartments with individual agitators therein, as shown schematically.

In the particular embodiment of the present invention now being described, the primary treatment means further includes an equalizing tank 13 for receiving the neutralized waste water from the first neutralizer 10 and in which it is held and gently agitated by an agitating means shown schematically. The purpose of the equalizing tank is to provide a sufficiently large capacity of waste water so that if the composition of the waste water varies from periodic batches of material being handled in the facility from which the waste water is obtained, the overall quality of the waste water will be equalized so as not to upset the biological treatment being carried out downstream of the equalizing tank due to uneven flow of the liquid into the biological treatment zone which may result in a biological imbalance and possibly a toxic shock to the biological treatment zone.

The primary treatment means further includes in the preferred embodiment a further neutralizer 16, which is essentially the same in structure as the neutralizer 10, for receiving the waste water from the equalizing tank 13 and in which a flocculating agent can be added, and in which further neutralizer material can be added, and further in which a nutrient, such as phosphorus and/or nitrogen are added, in order to provide a nutrient source for the biologically active bacteria which are used in the treatment process downstream of the second neutralizer. Again, the waste water is agitated by agitators, shown schematically.

The primary treatment means further includes a primary clarifier 19, which is essentially a large settling tank, which receives the waste water from the further neutralizer 16, and in which agitating means 20 is provided for gently agitating the waste water while solids precipitate out from the effect of the flocculating agent added in the neutralizer 16. The resulting precipitates, generally referred to as primary sludge, are removed from the bottom of the tank and disposed of separately.

The apparatus has an aerobic biological treatment zone in the form of an aeration tank 24 for receiving the waste liquid from the primary clarifier 19, and in which is provided an agitating means 25 for agitating the waste water in the aeration tank. In the present embodiment, air is supplied into the aeration tank beneath the level of the water therein through the agitating means 25, the particular structure including a hollow shaft and means for discharging the air supplied to the shaft through the impeller blades of the agitator. By this means, air is caused to bubble through the waste water in the aeration tank 24. In addition, particles of activated carbon are supplied into the aeration tank from time to time to provide particles of carbon for enhancing the action taking place in the aeration tank.

The process being carried out in the aeration tank in the present embodiment is that disclosed in U.S. Pat. No. 4,069,148, i.e. the action of biologically active solids on the impurities in the waste water, enhanced by activated carbon. The proportions are substantially those of the patent, and the materials used, including the bacteria, are according to the patent.

It will be understood that because of the purification process being carried out by the combined action of the biologically active material and the carbon particles in the aeration tank, the amount of volatile organic off-gases is reduced to substantially zero, and any gases escaping from the aeration tank are essentially unpolluted air and the like. Accordingly, no cover need be provided for the aeration tank.

From the aeration tank, the treated waste water is caused to flow into a sludge separating means in the form of a secondary clarifier 26, which is essentially the same as the primary clarifier, and which includes the agitating means 27. In this secondary clarifier, under general agitation by the agitator 27, the solids generated by the biological activity in the aeration tank, generally known as activated sludge, mixed with the carbon particles, settle out, and the purified waste water is discharged. The waste water is generally sufficiently pure to permit discharge directly into a natural body of water.

The activated sludge is withdrawn from the bottom of the secondary clarifier 26 by a recycling means constituted by pipes 26a and 26b and appropriate valves (not shown), by which a large proportion of the sludge is recycled into the aeration tank 24 in order to maintain the biological activity in the aeration tank. A smaller part is separated and directed into an aerobic digesting zone constituted by an aerobic digester 28, in which the activated sludge, to which no further nutrients have been added, is digested. This action is essentially for reducing the volume of the sludge, and involves for the most part the bacteria feeding on themselves.

Ordinarily, such an aerobic digester contains a means for supplying air to maintain the biological activity in the digester. The mechanism of such activity is essentially the same as in the aeration tank.

Off-gas collecting means is provided for collecting off-gases from the various parts of the apparatus for giving the primary treatment to the waste water. This means comprises an enclosure 11 for the neutralizer 10 to prevent escape of volatile organic off-gases which may escape from the industrial waste water which is being agitated and treated in the neutralizer. A gas feed line, shown schematically by a dotted line 12, is provided through which these off-gases mixed with the air in the neutralizer itself are able to be drawn off by a means to be described later.

The collecting means further includes a roof 14 for the equalizing tank for containing the off-gases from the waste water in the equalizing tank, and a line 15, shown schematically by the dotted line, extends from the tank roof 14 to permit drawing off the mixture of air and off-gases from within the roof.

The collecting means further includes an enclosure 17 for the neutralizer 16 for collecting the volatile organic off-gases, and a still further pipe 18, shown schematically by the dotted line, is provided to permit removal of the collected off-gases and the air with which they are mixed inside the cover 17.

Finally, the collecting means includes an enclosure 20 for the primary clarifier 19 for collecting the off-gases from the waste water in the clarifier, and from the cover 22 extends a gas line 23, shown schematically by the dotted line, through which the mixture of off-gases and air can be withdrawn from beneath the cover 22.

The air conduits 12, 15, 18, and 23 are connected together to a common gas line 29, which is connected to the intake of an air blower 30. The outlet to the air blower 30 is directed to aeration means 31 in the aerobic digester, which is, in the present embodiment, constituted by a perforated pipe or pipes extending down and then across the bottom of the aerobic digester 34 and in which holes are provided to permit escape of the gas pumped into the pipes from the blower 30. In order to permit addition of outside air should the volume of air and off-gases from the pieces of apparatus 10, 13, 16 and 19, be insufficient, an air intake line 32 with a control valve 33 is provided which has the free end open to the atmosphere.

While the collecting means is here shown as collecting the off-gases from the pieces of apparatus 10, 13, 16 and 19, should there be other pieces of apparatus where gases are given off from the waste water, such as splitter boxes for dividing the flow of the waste water and lift stations for pumping the waste water upwardly, these can be enclosed and a collection line connected between such enclosure and the common gas line 29.

The digested sludge is then passed from the aerobic digester into a sludge clarifier 34, containing an agitating means 35, and which is essentially the same as the primary and secondary clarifiers. In this sludge clarifier 34, the digested sludge is gently agitated while the solids separate and are then withdrawn from the bottom of the clarifier. The liquid can then be treated further or recycled into the aeration tank.

In the embodiment of FIG. 1, the gases collected from the pieces of apparatus 10, 13, 16 and 19 are supplied into the aerobic digester 28 to provide the air for the aerobic activity of the bacteria in this digester.

Figure 2:
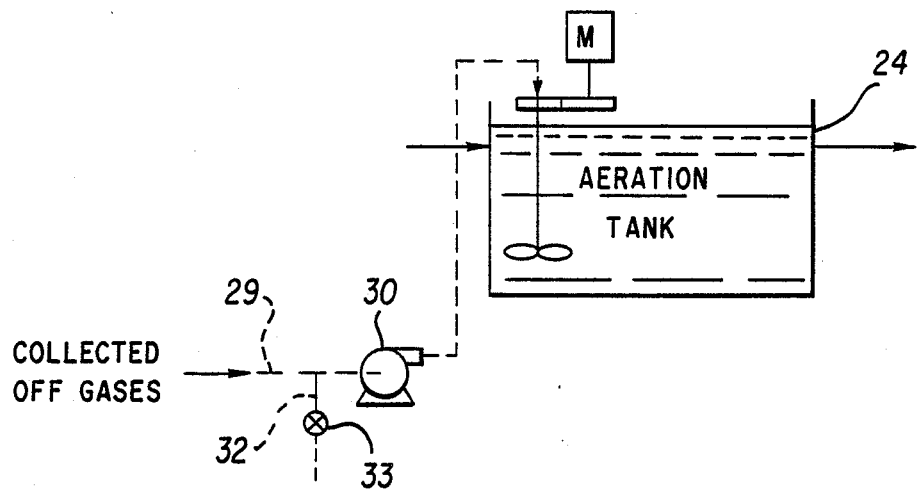
FIG. 2 is a partial diagram of a part of the diagram of FIG. 1, showing a modification thereof.

It is possible, however, to achieve similar results by using the collected gases from the line 29 and to supply them through the blower 30 into the aeration tank 24, as shown in FIG. 2. Again, the collected gases can provide some or all of the air for the aeration tank, depending upon the volume of air available from the pieces of apparatus 10, 13, 16 and 19. Again, the air intake 32 and valve 33 are provided for supplying addition air if necessary.

Figure 3:
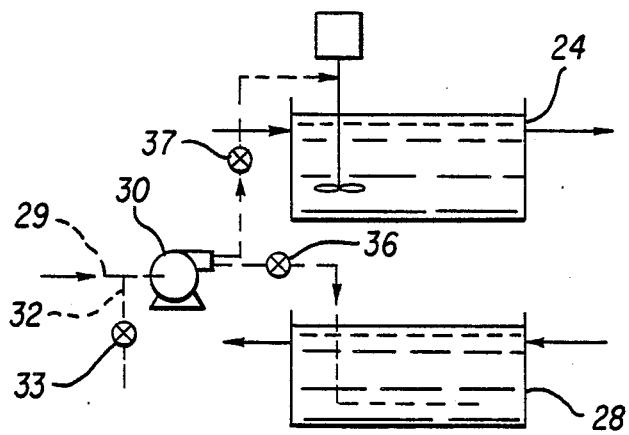
FIG. 3 is a partial diagram of a part of the diagram of FIG. 1, showing a different modification thereof.

Alternatively, as shown in FIG. 3, the blower 30 can be caused to supply some of the mixture of off-gases and air to the aeration tank 24 and some to the aerobic digester 28. Again, the air intake 32 and control valve 33 are provided for supplying additional air if necessary. In this arrangement, control valves 36 and 37 are incorporated into the system to modulate the flow of the collected gases to the aeration tank 34 and the aerobic digester 28. Alternatively the gas flow may be shut off to one or the other of aeration tank or aerobic digester so that the collected gases flow to one of these devices.

As can be seen by the above description of the apparatus for carrying out the purification of the industrial waste fluids, the industrial waste water and volatile organic off-gases may be both treated by relatively simple modifications of the existing aerobic biological treatment plant by adding means for purifying the off-gases, whereby the VOS is removed by directing it into the aerobic digester and/or aeration tank to biodegrade the VOS. According to this relatively simple modification of the existing equipment, the VOS can be virtually completely eliminated without the need of any after treatment while carrying out the normal waste water purification operation in the biological treatment plant.

SPECIFIC EMBODIMENTS

Studies were carried out to determine the effectiveness of the aforementioned method and apparatus at the Ciba-Geigy Plant at Toms River, N.J. through the period of Sept. 12 through Sept. 18, 1987. To determine the effectiveness of this procedure, hydrocarbon analyzers were used to determine the total hydrocarbon content of the off-grass before treatment and after treatment by use of an aerobic digester and an aeration basin to break down the VOS. The results are shown in Tables 1 and 2. The results are presented as ppm volatiles (measured as methane) and in estimated pounds per hour emission rates. The average pounds per hour emissions were 0.31 and 0.29 from the aerobic digester based on the one and twenty-four hour samples, respectively. The average emission rate from the aeration basin was 0.12 and 0.11 pounds per hour based on one hour and twenty-four hour samples, respectively.

TABLE 1

SUMMARY OF RESULTS
METHANE AND NOMETHANE HYDROCARBONS
-Aerobic Digester-

| Date | Time | THC Inlet (ppm) | Methane Outlet (ppm) | Total[a] Hydrocarbons Outlet (ppm) | Inlet Airflow Outlet (SCFM) | THC Emissions Outlet (pounds/hour) | Removal[c] Efficiency (%) |
|---|---|---|---|---|---|---|---|
| 9-16-87 | 1330–1430 | 932 | 0 | 10.5 | 9,000 | 0.42 | 98.87 |
| 9-17-87 | 1115–1215 | 634 | 0 | 7.5 | 8,300 | 0.15 | 98.82 |
| 9-18-87 | 1029–1129 | 642.5* | 0 | 14.5 | 9,000 | 0.32 | 97.74 |
| 9-16-87 | 1334–1434 | 932 | 0 | 18.5 | 9,000 | 0.40 | 98.02 |
| 9-17-87 | 1140–1240 | 634 | 0 | 16.0 | 8,300 | 0.32 | 97.48 |
| 9-18-87 | 1030–1130 | 642.5* | 0 | 12.0 | 9,000 | 0.26 | 98.13 |
| 9-16-87 | 1330–1430 | 932 | 0 | 21.0 | 9,000 | 0.45 | 97.75 |
| 9-17-87 | 1118–1218 | 634 | 0 | 16.5 | 8,300 | 0.33 | 97.40 |
| 9-18-87 | 1033–1133 | 642.5* | 0 | 8.5 | 9,000 | 0.18 | 98.68 |
| | | | | | | Avg. 0.31 | Avg. 98.10 |
| | | | TWENTY-FOUR HOUR SAMPLES | | | | |
| 9-17–9/18 | 1200–1100 | 500.79 | 0 | 13.0 | 8,300 | 0.38 | 97.40 |
| 9-16/9-17 | 1200–1100 | 539.08 | 0 | 19.0 | 9,000 | 0.24 | 96.48 |
| 9-15/9-16 | NA | NA | 0 | 11.0 | 8,200 | 0.26 | NA |

TABLE 1-continued
SUMMARY OF RESULTS
METHANE AND NOMETHANE HYDROCARBONS
-Aerobic Digester-

| Date | Time | THC Inlet (ppm) | Methane Outlet (ppm) | Total[a] Hydrocarbons Outlet (ppm) | Inlet Airflow Outlet (SCFM) | THC Emissions Outlet (pounds/hour) | Removal[c] Efficiency (%) |
|---|---|---|---|---|---|---|---|
| | | | | | | Avg. 0.29 | Avg. 96.94 |

[a]Measured as methane.
[b]Determined from in line flow transmitter data.
[c]Removal Efficiency = $\frac{\text{THC(inlet ppm)} - \text{THC(outlet ppm)}}{\text{THC(inlet ppm)}} \times 100$
*ES PPMs

TABLE 2
SUMMARY OF RESULTS
METHANE AND NOMETHANE HYDROCARBONS
-Aeration Basin-

| Date | Time | Methane (ppm) | Total Hydrocarbons (ppm) | Inlet Airflow (SCFM) | THC Emissions (pounds/hour) |
|---|---|---|---|---|---|
| 9-12-87 | 1130-1441 | 0 | 11.0 | 5,600 | 0.150 |
| 9-14-87 | 0907-1357 | 0 | 5.0 | 5,600 | 0.067 |
| 9-14-98 | 1015-1208 | 0 | 11.0 | 5,600 | 0.150 |
| 9-13-87 | 1205-1505 | 0 | 7.5 | 5,600 | 0.100 |
| 9-14-87 | 1205-1440 | 0 | 11.0 | 5,600 | 0.150 |
| | | | | | Average 0.123 |
| TWENTY FOUR HOUR SAMPLES | | | | | |
| 9-12/9-13 | | 0 | 5.0 | 5,600 | 0.067 |
| 9-13/9-14 | | 0 | 5.5 | 5,600 | 0.074 |
| 9-14/9-15 | | 0 | 2.0 | 5,600 | 0.027 |
| 9-14/9-15 | | 0 | 11.0 | 5,600 | 0.150 |
| 9-14/9/15 | | 0 | 15.0 | 5,600 | 0.200 |
| 9-14/9-15 | | 0 | 11.0 | 5,600 | 0.150 |
| | | | | | Average 0.111 |

As can be seen by the above, Applicants system is a distinct success removing at least about 97% of the VOS and resulting in de-minimus emissions.

The above illustrates the highly efficient and practical VOS-removing efficiency of the apparatus and method according to the present invention. The invention, of course, is not limited to the exact details shown and described, for obvious modifications will occur to those skilled in the art.

What is claimed is:

1. In a method for purifying industrial waste effluent including both waste water and off-gases containing volatile organic solvents by an aerobic biological waste water treatment system containing an aerobic treatment zone comprising a mixture of biologically active solids and activated carbon for treating the waste water, which involves subjecting the industrial waste water to a primary treatment to at least adjust the pH of the industrial waste water and remove the solids therefrom, subjecting the thus treated waste water to treatment in an aerobic biological treatment zone, supplying the biological treated waste water to a separation zone to separate the sludge produced in the aerobic treatment zone from the waste water to purify the waste water, transferring at least a portion of this sludge to an aerobic digesting zone, wherein the sludge is reduced in volume by action of aerobic microorganisms located therein, the improvement comprising concurrently collecting the off-gases containing volatile organic solvents in the industrial waste water primary treatment system, directing the thus collected off-gases to either the aerobic treatment zone or the aerobic digesting zone or to both the aerobic treatment zone and the aerobic digesting zone to biologically degrade and substantially eliminate the volatile organic solvents in the off-gases.

2. The improvement according to Claim 1 wherein the off-gases are directed to the aerobic digesting zone to biologically degrade and eliminate the volatile organic solvents in the off-gases.

3. The improvement according to claim 1 wherein the off-gases are directed to the aerobic treatment zone to biologically degrade and eliminate the volatile organic solvents in the off-gases.

4. The improvement according to claim 1 wherein the off-gases are directed concurrently to the aerobic treatment zone and the aerobic digesting zone to biologically degrade and eliminate the volatile organic solvents in the off-gases.

5. The improvement according to claim 1 wherein the off-gases are mixed with air from outside the system before being subjected to the biological treatment to degrade and eliminate the volatile organic solvents in the off-gases.

6. The improvement according to claim 1 wherein the off-gases are collected during the primary treatment of the waste water by enclosing all apparatus pieces included in said primary treatment up to the aerobic treatment zone and directing said off-gases to the biological treatment zone(s) by means of a blower located between the primary treatment of the waste liquid and the zones where said off-gas is to be biologically treated.

7. The improvement according to claim 1 wherein air is supplied to the aerobic treatment zone and the aerobic digesting zone in addition to the off-gases introduced in said aerobic treatment zone, the aerobic digesting zone or both.

* * * * *